United States Patent [19]
Tsukuda et al.

[11] Patent Number: 5,993,938
[45] Date of Patent: Nov. 30, 1999

[54] AROMATIC POLYAMIDE FILM, METHOD OF MANUFACTURING THE SAME AND MAGNETIC RECORDING MEDIUM USING THE SAME FILM

[75] Inventors: Akimitsu Tsukuda, Kyoto-fu; Mitsuhiro Horiuchi, Shiga-ken; Toshihiro Tsuzuki, Kyoto-fu, all of Japan

[73] Assignee: Toray Industries, Inc., Japan

[21] Appl. No.: 08/981,339

[22] PCT Filed: Apr. 17, 1997

[86] PCT No.: PCT/JP97/01336

§ 371 Date: Jan. 20, 1998

§ 102(e) Date: Jan. 20, 1998

[87] PCT Pub. No.: WO97/39876

PCT Pub. Date: Oct. 30, 1997

[30] Foreign Application Priority Data

Apr. 19, 1996 [JP] Japan .................................. 8-098146

[51] Int. Cl.⁶ .................................................... G11B 5/704
[52] U.S. Cl. ....................... 428/141; 428/323; 428/474.4; 428/474.7; 428/694 SL; 428/694 SG; 428/900
[58] Field of Search ..................................... 428/141, 323, 428/474.4, 474.7, 694 SL, 694 SG, 900

[56] References Cited

U.S. PATENT DOCUMENTS

| | | | |
|---|---|---|---|
| 4,645,702 | 2/1987 | Asakura et al. | 428/141 |
| 5,252,388 | 10/1993 | Murooka et al. | 428/328 |
| 5,645,918 | 7/1997 | Ito et al. | 428/141 |

Primary Examiner—Stevan A. Resan
Attorney, Agent, or Firm—Austin R. Miller

[57] ABSTRACT

The present invention relates to aromatic polyamide film which is characterized in that on at least one face thereof the number of projections of height at least 20 nm but less than 50 nm is from $10^3$ to $10^8$ per $mm^2$, and the number of projections of height at least 50 nm but less than 100 nm is from 0 to $3 \times 10^4$ per $mm^2$.

Further, the present invention also offers a method of producing an aromatic polyamide film which is characterized in that, in a method of producing aromatic polyamide film from a solution obtained by adding to an aromatic polyamide solution a particle-containing slurry formed by dispersing particles of particle diameter 10 to 300 nm in a liquid medium of 10 poise or less, such that the amount of said particles added in terms of the aromatic polyamide is 0.005 to 4.5 wt %, the relative standard deviation in the diameters of said particles is no more than 0.8 and, furthermore, there is used a particle-containing slurry where the initial filterability index Q1 of said particle-containing slurry and the filterability index Q2 after the passage of 500 ml of liquid satisfy the following relation.

$$Q2/Q1 \geq 0.3$$

While the film of the present invention is also ideal for use as flexible printed substrates, capacitors and printer ribbons, etc, since it is possible to realise extremely high levels of both output characteristics and durability, it is especially suitable for magnetic recording media, in particular for computer external memory and digital video tape where high density and high precision are demanded.

9 Claims, No Drawings

AROMATIC POLYAMIDE FILM, METHOD OF MANUFACTURING THE SAME AND MAGNETIC RECORDING MEDIUM USING THE SAME FILM

TECHNICAL FIELD

The present invention relates to an aromatic polyamide film, in particular to an aromatic polyamide film which is ideal for use as film for magnetic recording media and especially for high density magnetic recording media; and to a method for the production thereof; and to magnetic recording media formed using same.

TECHNICAL BACKGROUND

Aromatic polyamide film is being investigated in various applications to utilise its outstanding heat resistance and mechanical properties. In particular, para-oriented aromatic polyamide is superior to other polymers in its mechanical properties such as stiffness and strength, etc, so it is extremely useful in producing thinner film, and applications such as printer ribbons, magnetic tape and capacitors, etc, are being considered.

In recent years, along with the advance of digital recording technology and developments in computer external memory, etc, demands have increased for film suitable for thinner, higher recording density and highly durable magnetic recording media. That is to say, as the magnetic layers for realising high output, great progress has been seen in the formation of ultra-thin coated type magnetic layers and in metal evaporated type magnetic layers where the magnetic layer is formed directly on the film, but the higher the performance of the magnetic layer the greater the demand for the base film to attain high levels in terms of smoothness, running properties and lack of defects. Again, as the performance of the magnetic layer is further raised, so the film processing conditions involve ever higher temperatures and speeds, etc, and the burden applied to the base film becomes ever larger.

However, there are the following problems in the case where aromatic polyamide film is used. Firstly, if the surface is made smoother in order to raise the output characteristics, then, due to friction with the head, the magnetic layer tends to separate away and clogging of the head may occur due to the separated magnetic powder. Moreover, if surface roughening is carried out to improve the durability in this respect, then the output characteristics demanded of a high performance magnetic recording medium are no longer obtained and the head may be damaged by the surface projections. Secondly, if the surface is roughened to confer good running properties, transfer of such roughness to the magnetic layer may arise and loss of data by the magnetic recording medium may occur.

As examples where aromatic polyamide film has been used in magnetic recording media applications hitherto, there is the example where the height of minute projections at the surface and the diameter and number of the projections are prescribed (Japanese Unexamined Patent Publication No. 60-127523), and the example where the height of minute projections at the surface, the average diameter, the flatness of the projections, the diameter and number of the projections, and the ovalness, roundness of the projections are prescribed (Japanese Unexamined Patent Publication No. 61-246919), etc, but with these it may not be possible to achieve the extremely high levels of both output characteristics and durability to meet the latest advances in magnetic recording media.

Again, in Japanese Unexamined Patent Publication No. 3-113819, there is disclosed a magnetic recording medium in which an undercoat layer is provided on a non-magnetic support and there are present in this undercoat layer aggregated clumps, but coarse projections are readily formed by aggregated clumps and in some cases dropout becomes considerable. Moreover, by employing an undercoating stage, the productivity may be reduced.

Further, in Japanese Unexamined Patent Publication No. 8-77554, there is disclosed a magnetic recording medium where a ground layer is provided on a non-magnetic substrate and the height and number of projections on this ground layer are prescribed, but the regulation of the projection height is insufficient to achieve both the extremely high levels of output characteristics and durability to meet the latest advances in magnetic recording materials and, moreover, by employing a ground layer forming stage the productivity may be reduced.

As a result of intensive investigation into the causes of such problems, the present inventors have found that the height distribution of the projections at the surface of the aromatic polyamide film plays a considerable part, and they have discovered that by the optimisation of the projection height distribution it is possible to establish extremely high levels of both output characteristics and durability. It is on this discovery that the present invention is based.

DISCLOSURE OF THE INVENTION

The present invention has the objective of offering aromatic polyamide film which, by utilising the heat resistance and high rigidity of aromatic polyamide film, and, furthermore, by specifying the height distribution of projections at the surface thereof, can provide high levels of both output characteristics and durability when used as the base film for a magnetic recording medium; together with a method for the production of said film; and magnetic recording media employing same.

Specifically, the present invention relates to aromatic polyamide film which is characterized in that on at least one face the number of projections of height at least 20 nm but less than 50 nm is from $10^3$ to $10^8$ per $mm^2$, and the number of projections of height at least 50 nm but less than 100 nm is from 0 to $3 \times 10^4$ per $mm^2$, and to a method of producing aromatic polyamide film which is characterized in that, in a method of producing aromatic polyamide film from a solution obtained by adding to an aromatic polyamide solution a particle-containing slurry formed by dispersing particles of particle diameter 10 to 300 nm in a liquid medium of 10 poise or less, such that the amount of said particles added in terms of the aromatic polyamide is from 0.005 to 4.5 wt %, the relative standard deviation in the diameters of said particles is no more than 0.8 and, furthermore, there is used a particle-containing slurry where the initial filterability index Q1 of said particle-containing slurry and the filterability index Q2 after the passage of 500 ml of liquid satisfy the following relation,

Q2/Q1≧0.3 and also to magnetic recording media employing same.

MOST PREFERRED EMBODIMENTS OF THE INVENTION

The aromatic polyamide of the present invention is preferably one which contains at least 50 mol %, and more preferably at least 70 mol %, of repeating units represented by the following general formula (I) and/or general formula (II).

$$\text{---}(\text{HN}\text{---}\text{Ar}_1\text{---}\text{NHCO}\text{---}\text{Ar}_2\text{---}\text{CO})\text{---} \quad (I)$$

$$\text{---}(\text{HN}\text{---}\text{Ar}_3\text{---}\text{CO})\text{---} \quad (II)$$

As examples of $Ar_1$, $Ar_2$ and $Ar_3$, there are the following

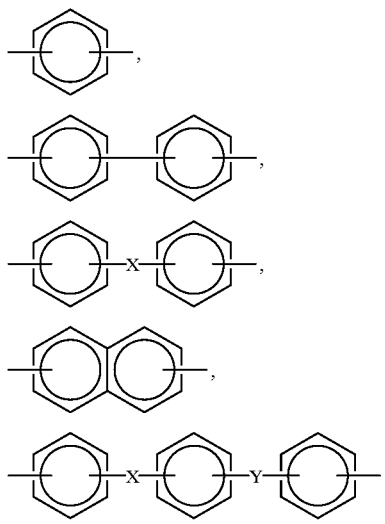

, and X and Y are selected from —O—, —CH$_2$—, —CO—, —SO$_2$—, —S— and —C(CH$_3$)$_2$—, etc, but there is no restriction to these. Furthermore, some of the hydrogen atoms on these aromatic rings may be replaced by substituent groups such as halogen groups (in particular chlorine), nitro groups, $C_1$ to $C_3$ alkyl groups (in particular methyl groups) and $C_1$ to $C_3$ alkoxy groups, etc, and hydrogens in the amide linkages from which the polymer is composed may also be replaced by other substituent groups.

From the point of view of properties, polymer in which at least 50%, and preferably at least 75%, of the total aromatic rings are coupled at their para-positions is desirable for providing film of high stiffness and excellent heat resistance. Further, when aromatic rings where some of the hydrogen atoms on the aromatic ring have been substituted by halogen groups (in particular chlorine) comprise at least 30% of the total aromatic rings, the moisture resistance is enhanced and properties such as the dimensional variation or reduction in stiffness caused by moisture absorption are improved, so this is desirable.

The aromatic polyamide of the present invention contains at least 50 mol % of repeating units represented by general formula (I) and/or general formula (II) above, and, for the remaining <50 mol %, other repeating units may be copolymerized or blended.

Moreover, additives such as antioxidants may also be blended with the aromatic polyamide of the present invention, in an amount such that the properties of the film are not impaired.

It is necessary that, on one surface (hereinafter referred to as the A-surface) of the aromatic polyamide film of the present invention, the number of projections of height at least 20 nm but less than 50 nm be from $10^3$ to $10^8$ per mm$^2$, and that the number of projections of height at least 50 nm but less than 100 nm be from 0 to $3\times10^4$ per mm$^2$ Here, said number of projections of height at least 20 nm but less than 50 nm is necessary for providing a high level of both output characteristics and durability at the time of repeated running, and if this number is less than $10^3$ per mm$^2$ then, while the initial output is high, output falls during repeated running and problems may arise in terms of durability. Further, if there are more than $10^8$ per mm$^2$, the output characteristics may be lowered. Preferably the number is from $10^4$ to $5\times10^5$ per mm$^2$. Furthermore, if the number of projection of height at least 50 nm but less than 100 nm exceeds $3\times10^4$ per mm$^2$, then head scraping arises during running and there are problems in terms of durability. Preferably the number is no more than $2.5\times10^2$ per mm$^2$. Again, if there is a small amount of projections of height at least 50 nm but less than 100 nm, friction is reduced at the time of the running of the film or magnetic recording medium, and durability enhanced, so it is further preferred that there be at least $0.3\times10^3$ such projections per mm$^2$. The method of production of the aromatic polyamide film relating to the present invention is not restricted insofar as it relates to film of the invention, and can, for example, readily be undertaken by those skilled in the art based on the following pointers.

In order to realise the aforesaid surface characteristics, particles may be incorporated into the aromatic polyamide film of the present invention. The particle diameter will be in the range from 10 to 300 nm, more preferably from 20 to 200 nm and still more preferably from 25 to 100 nm and, as examples of the materials, there are particles comprising organic polymers such as for example crosslinked polystyrene, acrylic particles, polyester particles, polyimide particles, polyamide particles and fluoropolymer particles, etc, and those comprising inorganic particles such as colloidal silica, titanium oxide, aluminium oxide, zirconium oxide, calcium carbonate, carbon black and zeolite, etc.

The amount incorporated into the film will preferably lie in the range 0.005 to 4.5 wt % and more preferably in the range 0.03 to 1.2 wt %, but this will vary with the specific gravity and size of the particles, and it is necessary that there be incorporated an amount which provides the desired numbers of projections.

In the aromatic polyamide film of the present invention uniform projections are formed so, in terms of the particle shape, spherical particles are preferred, and the use of particles of uniform particle diameter is desirable. Specifically, the relative standard deviation σ in the particle size distribution (defined as the standard deviation divided by the average particle diameter) is preferably such that a σ≧0.80, more preferably σ≧0.30 and still more preferably ≧0.15. Where σ is greater than 0.80, particle diameter uniformity is impaired and, furthermore, re-aggregation of the particles may occur in the particle slurry to be added to the aromatic polyamide solution or in the aromatic polyamide polymer solution, so that film of the present invention may not be obtained.

In regard to the method for incorporating said particles into the film, it is desirable firstly that they be mixed and dispersed beforehand in the form of a slurry in a liquid medium of no more than 10 poise, for example an organic solvent, inorganic solvent, or organic solution of organic polymer, which does not dissolve said particles. The type of organic polymer here is not especially restricted but, from the point of view of affinity with the aromatic polyamide and the heat resistance required at the time of the film production, it is desirable that it be the same or different aromatic polyamide, or an aromatic polyimide. Further, the concentration of the organic polymer in the slurry is not especially restricted but, in terms of raising the mixing efficiency when adding the particle slurry to the aromatic polyamide solution, a concentration of from 0.001 to 10 wt % is preferred and from 0.01 to 3.5 wt % still further preferred. The method of dispersion can be a means such as ultrasonic dispersion, media dispersion or high pressure homogenizer dispersion, etc, but unless thorough dispersion is carried out, aggregated particles may be produced and the ranges in the present invention exceeded. Further, filtering the particle slurry after the dispersion, with a filter of filtration precision 0.84 μm or better, more preferably 0.6 μm or better and still more preferably 0.3 μm or better, is effective in terms of forming uniform projections.

Moreover, it is desirable that the initial filterability index Q1 of the particle slurry and the filterability index Q2 following the passage of 500 ml of the particle slurry satisfy the relation $Q2/Q1 \geq 0.3$. Here, the filterability index is the flow rate of the particle slurry passing through a glass fibre filter of filtration precision 0.5 μm (e.g. GC-50 made by ADVANTEC (Co.)) per unit time under a head pressure of 490 to 1470 Pa, and is defined by the following relation.

$$\text{filterability index} = \frac{\text{amount of particle slurry liquid passing through the filter (ml)}}{\text{cross-sectional area of filter material (cm2)} \times \text{time (min)}}$$

The initial filterability index Q1 denotes the filterability index directly after the commencement of filtration and is the average value over the five minute period from the commencement of filtering. Further, Q2 is the average value over the five minute period following the passage of 500 ml of the particle slurry through said filter. The filterability index ratio denoted by Q2/Q1 is influenced by the variation in the particle diameter, the particle dispersion properties prior to filtering, the affinity of the solvent for the particles, and the surface potential of the particles, etc, but if $Q2/Q1 \geq 0.3$, the particles have excellent dispersion properties in the particle slurry or in the aromatic polyamide polymer solution, so the film of the present invention can be ideally obtained. More preferably, $Q2/Q1 \geq 0.5$ and still more preferably $Q2/Q1 \geq 0.8$. If Q2/Q1 is less than 0.3, then even though filtering of the particle slurry is carried out with a filter of the desired filtration precision, particle aggregation will readily occur in the particle slurry after filtering or in the aromatic polyamide polymer solution, or at the time of the film formation, and the film of the present invention may not be obtained.

In the aromatic polyamide film of the present invention, as a means for forming still more uniform projections, it is effective to employ particles which have been modified by subjecting the aforesaid organic polymer particles or inorganic particles to a surface treatment with an organic polymer, e.g. by the coating or adsorption of an organic polymer. The surface treatment need not only be with an organic polymer, and may also be with low molecular material, but the type of organic polymer formed as a result should be suitably selected according to the particles and the solvent employed for the polymer, etc. Examples are polyester, acrylic, acrylate, polyvinyl pyrrolidone, polyvinyl alcohol and polyethylene glycol, etc. As an example of one method of modifying the particles with organic polymer, the surface of the particles can be modified with organic polymer by slowly adding to the particle dispersion medium organic polymer dissolved in the dispersion medium in the same way, and then reacting for from 30 minutes to 3 hours at 20° C. to 200° C., preferably at 80° C. to 150° C.

If particles are used which have been prepared by such a method, aggregation of the particles is suppressed in the film production process, so the surface projections obtained are more uniform and the number thereof is increased, and therefore it is possible to produce film which, when made into a magnetic recording medium, is outstanding in its output characteristics, durability and lack of susceptibility to heat. Moreover, because coarse projections are reduced, it is also possible to reduce dropout.

In regard to the method for incorporating said particles into the film, it is desirable firstly that they be mixed and dispersed beforehand in the form of a slurry in an organic solvent, inorganic solvent or aromatic polyamide solution of no more than 10 poise, which does not dissolve said particles. The method of dispersion can be a means such as ultrasonic dispersion, media dispersion or high pressure homogenizer dispersion, etc, but unless thorough dispersion is carried out, aggregated particles may be produced and the ranges in the present invention exceeded. Further, filtering the particle slurry after dispersion with a filter of filtration precision 0.8 μm or better and more preferably 0.6 μm or better is effective in terms of forming uniform projections. Again, in regard to the point of addition, said addition may be carried out prior to the polymerization, during the polymerization or after the polymerization.

If the number of projections of height at least 5 nm but less than 20 nm on the A-surface of the aromatic polyamide film of the present invention is at least $5 \times 10^3$ per mm$^2$ then, in particular in the case of a vapour-deposited type magnetic recording medium, it is possible to suppress the occurrence of so-called heat susceptibility, i.e. dimensional changes caused by heating, due to a reduction in the contact area on the cooling can, so this is desired. Preferably, there is present at least $10^5$ per mm$^2$ and more preferably $10^6$ per mm$^2$.

The following methods may be cited for achieving the aforesaid surface properties. As a first method, there is the method of incorporating particles of small particle diameter, namely of particle diameter 5 to 50 nm and more preferably 5 to 20 nm, along with the particles described above. The type of said particles may be the same as or different to those described above, and just as in the case of the aforesaid particles they can be added to an organic solvent, inorganic solvent or aromatic polyamide solution and, following dispersion and filtering, then added to the polymer solution. Moreover, in the same way as above, it is preferred that modification of the particle surface be carried out with a suitable organic polymer. As a second method, the particles are added to an organic solvent such as N-methyl-2-pyrrolidone or dimethylacetamide, to an aqueous solution of a water-soluble polymer such as methyl cellulose, or to a solution comprising aromatic polyamide/organic solvent, etc, after which filtering and dispersion are carried out, and then the slurry obtained thinly applied to the film, and dried, to form a particle layer on the film surface. The particle concentration in the slurry and the amount applied can be suitably selected according to the diameter of the particles and the specific gravity, etc, but in general the particle concentration is selected from within the range 2 to 20 wt % and the amount applied from within the range 0.1 to 3 g/m$^2$. Further, the thickness of the particle layer is preferably from 1 to 50 nm and more preferably from 3 to 15 nm. The time of application of the slurry may be at any time, such as after extrusion from the die, after the drying stage, after the wet stage or after the film formation.

It is necessary that the face of the film of the present invention at the side which is provided with the magnetic layer be highly defect-free. That is to say, at the A-surface of said film it is preferred that the number of coarse projections (A; number per 100 cm$^2$) of height h (nm) satisfy the following relationships.

| | |
|---|---|
| h ≥ 270 | A < 100 |
| h > 540 | A < 70 |
| h > 810 | A < 15 |
| h > 1080 | A < 5 | more preferably

| | |
|---|---|
| h ≥ 270 | A < 30 |
| h > 540 | A < 10 |
| h > 810 | A < 5 |
| h > 1080 | A < 2 | and still more preferably

| | |
|---|---|
| h ≥ 270 | A < 15 |
| h > 540 | A < 5 |
| h > 810 | A < 1 |
| h > 1080 | A < 0 |

In regard to the latest high density magnetic recording media typified by digital tape for data storage, at film faces with numerous defects, i.e. where the number of coarse projections exceeds these ranges, dropout, which is one of the electromagnetic conversion characteristics, is considerable and so it is absolutely impossible to use the film in the applications of the present invention. In order to satisfy the above relationships, it is preferred that coarse foreign matter present in the polymer be eliminated by passing the film-forming solution through a filter with a specified filtration precision. Here, the filtration precision is defined as the particle diameter of the particles-when exactly 95% thereof are captured on the filter, when particles dispersed in polymer or solvent, etc, are passed through a filter. Naturally, the smaller the value of the filtration precision, the smaller the size of the foreign matter that can be eliminated. The filtration precision of the filter in the present invention is 6000 nm or better, preferably 5000 nm or better and more preferably 3000 nm or better. Furthermore, for the purposes of realising a defect-free surface, there is also the method of employing clean polymer by carrying out filtration at the polymer raw material stages, i.e. the polymer starting materials and additives, etc.

Now, it is further preferred that the aforesaid number of coarse projections be satisfactory too on the surface on the other side (hereinafter referred to as the B-surface).

For aromatic polyamide film of the present invention, it is preferred that the three-dimensional surface roughness SRa1 at a measurement area of 0.002 mm² on the A-surface and the three-dimensional surface roughness SRa2 at a measurement area of 1.0 mm² satisfy the following relationship.

$$0.8 \leq SRa2/SRa1 \leq 2.5$$

Where the ratio SRa2/SRa1 exceeds 2.5, rising and falling undulations are produced in the film surface and, when the film is used for magnetic tape, there is unstable head contact, and a lowering of output and data loss, etc, may arise. On the other hand, if SRa2/SRa1 is less than 0.8, there may occur a lowering of the running properties of the magnetic tape and, when wound in a roll shape, blocking may occur. SRa2/SRa1 preferably lies within the following range.

$$1.1 \leq SRa2/SRa1 \leq 1.8$$

Now, it is further preferred that the range of SRa2/SRa1 be satisfied too in the case of the B-surface.

The following methods, for example, are effective for controlling SRa2/SRa1 to within the aforesaid range. In the film production process, there is the method of subjecting the roll face which contacts the film following separation from the endless belt, etc, to mirror surface polishing; the method of keeping the temperature in the solvent extraction stage within the range, for example, −10 to 50° C., so as to prevent the film solvent extraction or drying from occurring very rapidly; the method of keeping the polymer concentration in the film at the time of separation from the endless belt at 30 to 70 wt %; the method of preheating the film to a temperature of 50 to 100° C. in the stage prior to carrying out stenter drying and heat treatment; or combinations of the aforesaid methods.

The aromatic polyamide film of the present invention may be produced as a simple film or it may be a laminate film. In the case of a laminate film, it is necessary that the film of the present invention be provided as the outermost layer on at least one face. For example, in the case where it is formed from two layers, ideally the layer of film of the present invention (hereinafter referred to as the A-layer) is the surface on which the magnetic layer is formed, while the other layer (hereinafter referred to as the B-layer) is the running surface. In such circumstances, in a preferred practical embodiment, in the B-layer there are used particles of greater diameter than the particles used in the A-layer so as to enhance the running properties of the film. Further, in the case of three or more layers, the same applies. A known method can be used for the method of lamination thereof, for example the method of laminating within the die, the method of laminating in a feed block, or the method of forming one layer and then forming another layer thereon, etc. Further, the film may also be a laminate film formed by first extruding from a die, after which there is applied a solution containing particles.

It is preferred that the tensile Young's modulus of the aromatic film of the present invention be at least 9.8 GPa in at least one direction. The output of a magnetic tape is raised along with enhanced head contact between the tape and head but, as a result, a high Young's modulus is demanded of the substrate film Where the recording method is a fixed head system, the lengthwise Young's modulus is of particular importance, while where it is a helical scan system, the widthwise Young's modulus is of particular importance, and if the value is less than 9.8 GPa in both such substrate film directions then whichever recording system is employed a high output is not obtained. Now, the Young's modulus of the aromatic polyamide film of the present invention is preferably at least 11.7 GPa and more preferably at least 12.7 GPa in at least one direction. It goes without saying that it is preferred that the Young's modulus in all directions be at least 9.8 GPa.

The aromatic polyamide film of the present invention can be used advantageously in various applications such as flexible printed substrates, capacitors, printer ribbons, acoustic vibrators and the base film of solar cells but, when employed as a magnetic recording medium with a magnetic layer provided on at least one face, the beneficial effects of the aromatic film of the present invention in combining high output, high durability and lack of defects are fully manifested and so this is especially preferred.

The form of the magnetic recording media of the present invention may be that of a disc, card or tape, etc, and is not particularly restricted but in order to meet a reduction in thickness while making full use of the outstanding surface properties and high Young's modulus of the aromatic polyamide film of the present invention, it is possible for the outstanding effects of regulating the surface form and having a high stiffness to be manifested all the more when producing high density magnetic tape of long length where the thickness of the substrate comprising aromatic polyamide film is no more than 6.5 μm, the width is 2.3 to 9.0 mm, the length is at least 100 m per reel, and the recording density as a magnetic recording medium (when not compressed) is at least 8 kilobyte per mm$^2$, so this is especially preferred. Here, recording density is the value of the recording capacity of the magnetic recording medium as a whole divided by the area of the magnetic face. In recent years, there has been a strong demand to make magnetic recording media typified by magnetic tape ever more compact and of higher capacity, and in terms of achieving increased capacity, there are the following means. One is the method of enhancing the recording capacity as a whole by reducing the thickness of the substrate and increasing the length, and another is the method of increasing the recording capacity per unit area by narrowing the track pitch and shortening the wavelength of the recording wavelength. In general, these tend to be jointly employed. Where the thickness of the substrate is reduced, it is of course necessary that the stiffness of the substrate be high, but compared to when the substrate is thick the contribution of the substrate surface in terms of the head contact and, consequently, the electromagnetic conversion characteristics, becomes considerable. That is to say, where the tape is thick, high values of running tension and head contact pressure can be set, so it is possible to achieve stable contact with the head even without the substrate surface being regulated, whereas in the case of tape of reduced thickness, the running tension and the head contact pressure have to be lowered and, consequently, if the substrate surface is not regulated as in the present invention, the close contact with the head and the running properties are uneven and unstable, so that deviation from the track position or signal loss tend to occur. Further, due to the demand for higher speed data transfer rates, there is a trend for the relative speed of the head and track to become higher than hitherto, but the aromatic polyamide film of the present invention, where the projection height and number are controlled within specified ranges, is also extremely effective in ensuring that more frictional heat than is necessary is not generated by such trends. Thus, as stated above, with the aromatic polyamide film of the present invention it is possible to produce magnetic tape which can meet such demands for higher capacities. The thickness of the substrate is preferably no more than 4.5 μm and more preferably no more than 3.5 μm, and the recording density as a magnetic recording medium is preferably at least 15 kilobyte per mm$^2$, more preferably at least 25 kilobyte per mm$^2$ and still more preferably at least 34 kilobyte per mm$^2$.

Further, the magnetic recording media of the present invention can be used advantageously for consumer use, professional use, D-1, D-2, D-3 and other such broadcast station use, digital video cassettes, DDS-2, 3, 4, data 8 mm, QIC and other such data storage applications, but it is ideally employed in data storage applications where reliability in terms of data loss is most important.

Any method of forming the magnetic layer can be used, such as a coating method whereby iron oxide, metal powder or other such magnetic powder is mixed with a thermosetting, thermoplastic or radiation beam setting binder, etc, and then application thereof and drying carried out, or a dry method of forming a magnetic metal thin film layer of Ni, Co, Cr, Fe, γ-Fe2O3 or other such metal or alloy thereof directly on the substrate film by vapour deposition, sputtering or ion plating, etc, but in cases where a dry method is employed the outstanding surface properties of the film of the present invention are all the more manifested, so this is preferred. In cases where a dry method is used, there may be formed a protective coating such as a diamond-like coating with the objective of enhancing the durability of the magnetic recording medium obtained all the more and of conferring sliding properties.

Further, regarding the magnetisation system, either horizontal magnetisation or vertical magnetisation can be employed, and the film can also be appropriately used for optical recording tape.

Next, the production method of the present invention will be explained but there is to be no restriction thereto.

Firstly, where the aromatic polyamide is obtained from acid chloride and diamine, synthesis is conducted in an aprotic organic polar solvent such as N-methylpyrrolidone (NMP), dimethylacetamide (DMAc) or dimethylformamide (DMF), etc, by solution polymerization, or by interfacial polymerization using an aqueous medium, etc. Where acid chloride and diamine are used as monomer, hydrogen chloride is produced as a by-product in the polymer solution, and where this is to be neutralised, there is used an inorganic neutralising agent such as calcium hydroxide, calcium carbonate or lithium carbonate, etc, or alternatively an organic neutralising agent such as ethylene oxide, propylene oxide, ammonia, triethylamine, triethanolamine or diethanolamine, etc. Furthermore, reaction between isocyanate and carboxylic acid is carried out in the presence of catalyst in a non-protic organic polar solvent.

These polymer solutions may be used directly as the film-forming stock solution or the polymer may be temporarily isolated and then redissolved in an aforesaid organic solvent or in an inorganic solvent such as sulfuric acid, etc, to prepare the film-forming stock solution.

The intrinsic viscosity of the polymer (the value measured at 30° C., using 100 ml of a solution of 0.5 g of polymer in sulfuric acid) is preferably at least 0.5 to obtain the aromatic polyamide film of the present invention.

As a solubilizer, an inorganic salt such as calcium chloride, magnesium chloride, lithium chloride or lithium nitrate may also be added to the film-forming stock solution. The concentration of the polymer in the film-forming stock solution is preferably about 2 to 40 wt %.

In regard to the method of adding the particles, there is the method of thoroughly slurrying the particles beforehand in solvent, after which this is used as polymerization solvent or as a diluent solvent, and also the method of direct addition of the particles following the preparation of the film-forming stock solution.

The film-forming stock solution prepared as described above is filtered by means of a filter of filtration precision 6000 nm or better, after which the solution is converted into film by a so-called solution casting process. Solution casting processes include dry/wet, dry and wet processes, etc. In the case where the film is produced by a wet process, the film-forming stock solution is first filtered, after which it is either directly extruded from a die into a film-forming bath, or it is first extruded onto a support such as a drum or belt, etc, and then introduced into a wet bath along with the support. This wet bath generally comprises an aqueous medium and, along with the water, may contain organic or inorganic solvents or inorganic salts, etc. The temperature of said bath is normally from 0 to 100° C., and extraction of the salts and solvent contained in the film is conducted by the passage through the bath. Here, when the film is led into the bath, it does not yet have sufficient surface hardness so, if there are contaminants in the bath medium, these will adhere to the film surface and impair the surface properties. Thus, the medium employed in the bath needs to be first passed through a filter of filtration precision 6000 nm or better, preferably 5000 nm or better and still more preferably 3000 nm or better. The time of passage through the entire bath is from 10 seconds to 30 minutes but will depend on the film thickness. Furthermore, where required, stretching is carried out in the film lengthwise direction. Next, drying and heat treatment are carried out, and generally speaking it is desirable that these treatments be conducted at 200 to 500° C. for a total of 1 second to 30 minutes. Where required, stretching in transverse direction is carried out in this stage.

In the case where the film production is carried out by a dry/wet process, the stock solution is extruded from the die onto a support such as an endless belt, to form a thin film and then drying is carried out by driving off the solvent from this thin film layer, until the thin film possesses self-sustainability. The drying conditions comprise up to 60 minutes at from room temperature to 220° C., preferably from room temperature to 200° C. Further, by controlling the frequency of surface defects on the drum or endless belt used in this drying process, it is possible to control the surface properties of the B-surface. Preferably, the frequency of surface defects of diameter at least 30 µm is from 0.001 to 0.02 per mm$^2$, and more preferably from 0.002 to 0.015 per mm$^2$. The film following the end of this dry stage is separated from the support and then introduced into the wet stage and, in the same way as in a wet process above, removal of the solvent and salts is carried out. Furthermore, stretching, drying and heat treatment are carried out, to form the film.

In the case where a dry process based process is used, the drying is performed on a drum or endless belt, etc, then a self-sustaining film separated from the support and stretching in the film lengthwise direction carried out. Further, drying to eliminate residual solvent, and stretching and heat treatment are carried out. These treatments are preferably conducted at 200 to 500° C., for from 1 second to 30 minutes, but it is further preferred that they be carried out below the heat resistance temperature of the organic particles.

The film formed as described above is subjected to stretching during the film production process so that the mechanical properties and thermal properties lie within the range of the present invention. The stretch ratio is preferably within the range 0.8 to 8.0 (the stretch ratio is defined as the value of the film area after stretching divided by the film area before stretching) and more preferably from 1.1 to 5.0.

The values of the properties described in this invention are based on the following methods of measurement and evaluation criteria.

(1) Projection height and number

Using an electron microscope, an image of the surface of the film obtained following shadowing (angle=5°) was observed. From the length of the shadow, the projection height was obtained, and the number of projections was counted. The same procedure was carried out for 10 fields of view and the average of these was taken as the number of projections. The measurement conditions were as follows.

device scanning electron microscope (S-900H made by Hitachi Ltd.)

magnification 5000 times (in the case of the number of projections of height at least 20 nm but less than 50 nm, and also in the case of the number of projections of height at least 50 nm but less than 100 nm)

30000 times (in the case of the number of projections of height at least 5 nm but less than 20 nm)

However, depending on the number of projections, in both cases observation may be performed at still higher magnification.

acceleration voltage 5 kV sample preparation direct method, Ag shadowing angle of inclination 5°

(2) Three dimensional surface roughness

Measurement was carried out using a micro-form measurement instrument ET-30HK made by Kosaka Seisakusho (Co.). As a detector there was used an optical probe (HIPOSS, commercial name), and measurement was carried out after the deposition of aluminium vapour onto the film surface under vacuum. The measurement conditions were as follows.

(i) SRa1 (measurement area 0.002 mm$^2$)

measurement length in the lengthwise direction 0.02 mm measurement length in the widthwise direction 0.10 mm cut off value 0.08 mm (i) SRa2 (measurement area 1.0 mm$^2$)

measurement length in the lengthwise direction 0.50 mm measurement length in the widthwise direction 2.00 mm cut off value 0.08 mm (3) Coarse projection count Observation was made with a stereo-microscope, under polarized light, over a film surface range of at least 50 cm$^2$, and coarse projections such as foreign matter, etc, were marked. The projection height was determined by the multiple interference method, and the number determined was converted to a number per 100 cm$^2$.

(4) Tensile Young's modulus

Film was cut to width 10 mm and length 150 mm, and stretching carried out using an Instron type tensile testing machine based on a chuck separation of 100 mm and under conditions comprising an extension rate of 300 mm per minute, a chart speed of 500 mm per minute, a temperature of 23° C. and a relative humidity of 65%. The tensile Young's modulus was determined from the tangent at the place where the load-extension curve obtained rose up.

(5) Average particle diameter of the contained particles

The particles were observed using an electron microscope, and the image of the particles (dark/light produced by the particles) was linked to an image analyser (e.g. QTM900 made by Cambridge Instrumental). Then, the following numerical treatment was carried out for at least 5000 particles, with the observation location being varied. The numerical average diameter D determined in this way was taken as the average particle diameter.

$$D = \Sigma Di/N$$

Here, Di is the circular equivalent diameter of the particle and N is the number of particles.

(6) Relative standard deviation of the contained particles

This was expressed by the value $\sigma/D$ obtained by dividing the standard deviation $\sigma(=\{\Sigma(Di-D)^2/N\})$, calculated from the particle diameter Di measured by the method in (4) above, the average particle diameter D and the total number of particles N, by the average particle diameter D.

(7) Contained particle content

The film was dissolved in a solvent selected so as not to dissolve the particles, after which the particles were collected by centrifuging and then the proportion (weight percentage) of the particles in terms of the total weight was taken as the particle content. In some cases, it is effective to jointly employ an infrared spectral method.

(8) Output characteristic (initial output characteristic)

Film on which a magnetic layer had been formed was slit to a width of 6.35 mm and length of 150 m, and incorporated into a cassette, after which recording of a 6.5 MHz sine wave was carried out at the optimum recording current. The initial output characteristic was expressed by the difference in the play-back output compared to a standard tape.

(9) Durability

The tape cassette obtained in (8) above was played 100 times under atmospheric conditions of 40° C. and 80% relative humidity, then the output characteristic measured, and evaluation performed based on the following standards.

○: difference from initial output characteristic less than 1 dB

Δ: difference from initial output characteristic at least 1 dB but less than 3 dB X: difference from initial output characteristic at least 3 dB

(10) Assessment of heat susceptibility

In regard to the heat susceptibility, electron beam vapour deposition of a 0.2 $\mu$m thickness Co—O coating was carried out in a $2\times10^{-3}$ Pa vacuum, along a cooling can at $-10°$ C., and then 10 m of the film observed in its lengthwise direction. Assessment was made by the extent of distortions, i.e. swellings or depressions, etc, caused by the heat.

absolutely no distortions after coating ⊚ from 1 to 5 local distortions (swellings, depressions) ○ from 6 to 10 local distortions (swellings, depressions) Δ more than 10 local distortions (as well as swellings and depressions, holes caused by the heat) X

(11) Measurement of drop-out

By means of a video deck, the tape cassette obtained in (8) above was subjected to the recording of a 4.4 MHz signal and then the tape played back. Using a drop-out counter made by Ohkura Industry (Co.) the number of drop-outs at 15 $\mu$sec-20 dB was measured over 20 minutes, and the number of drop-outs per 1 minute (No./min) calculated.

Next, the invention is explained based on examples, but in no way are these to restrict the interpretation of the invention in this present application.

EXAMPLE 1

As the aromatic diamine component, an amount of 2-chloro-p-phenylenediamine corresponding to 80 mol % and an amount of 4,4-diaminodiphenyl ether corresponding to 20 mol % were dissolved in N-methyl-2-pyrrolidone (NMP), and then to this there was added an amount of 2-chloro-terephthaloyl chloride corresponding to 100 mol %, and stirring carried out for 2 hours to complete the polymerization. Neutralization was performed with lithium hydroxide, and there was obtained an aromatic polyamide solution of polymer concentration 10 wt % and viscosity 3000 poise.

(Preparation of the polymer solution for the A-layer)

Spherical silica of average particle diameter 50 nm and having a particle diameter distribution of relative standard deviation 0.12 was subjected to 24 hours ultrasonic dispersion in NMP, after which filtration was carried out using, in turn, filters of filtration precision 1.0 $\mu$m, 0.6 $\mu$m and 0.3 $\mu$m. The filterability index ratio Q2/Q1 of this particle slurry was 0.92. Silica slurry obtained in this way was added to the aromatic polyamide solution to give 0.3 wt % in terms of the polymer, and then thorough stirring carried out to produce the polymer solution for the A-layer.

(Preparation of the polymer solution for the B-layer)

Silica of average particle diameter 150 nm and having a particle diameter distribution of relative standard deviation 0.20 was subjected to 24 hours ultrasonic dispersion in NMP, after which filtration was carried out using, in turn, filters of filtration precision 1.2 $\mu$m and 0.8 $\mu$m. The filterability index ratio Q2/Q1 of this particle slurry was 0.87. Silica slurry obtained in this way was added to the aromatic polyamide solution to give 1.2 wt % in terms of the polymer, and then thorough stirring carried out to produce the polymer solution for the B-layer.

The polymer solutions for the A-layer and the B-layer were respectively passed through filters of filtration precision 1000 nm and 5000 nm, after which they were combined using a layered tube, with the B-layer in contact with the support and such that the final film layer thicknesses were A-layer/B-layer=2.0/1.6 $\mu$m, and then cast onto an endless belt having a frequency of surface defects of diameter 30 $\mu$m or more of 0.005 per mm². The solvent was evaporated off by heating for 2 minutes with a hot draught at 180° C., and a self-sustaining film was continuously separated from the belt. Next, this film was led into a water bath at 40° C. which had been filtered with a filter of filtration precision 4000 nm, and residual solvent plus the inorganic salts produced by the neutralization extracted by means of the water. After firstly carrying out 30 seconds preliminary drying at 80° C. on a stenter, drying of the moisture and heat treatment were conducted and an aromatic polyamide film of thickness 3.6 $\mu$m obtained. During this time, drawing of the film in its lengthwise and widthwise directions was carried out by factors of 1.16 and 1.43 respectively, and after conducting drying and heat-treatment for 1.5 minutes at 280° C., slow cooling was conducted at 20° C. per second and the aromatic polyamide film obtained.

On the A-surface of this film, the number of projections of height at least 20 nm but less than 50 nm was $2.1\times10^5$ per mm², the number of projections of height at least 50 nm but less than 100 nm was $1.2\times10^4$ per mm², and the number of projections of height at least 5 nm but less than 20 nm was $8.6\times10^4$ per mm². Further, the number of coarse projections of h≧270 nm, h>540 nm, h>810 nm and h>1080 nm was 8, 1, 0 and 0 per 100 cm² respectively, while SRa2/SRa1 was 1.16, and the tensile Young's modulus in the lengthwise and widthwise directions was 12.0 GPa and 16.7 GPa respectively.

Inside a $2\times10^{-3}$ Pa vacuum chamber, Co was evaporated onto this film by means of an electronic gun heater, while introducing oxygen, and on the film A-side surface there was continuously formed a Co—O coating of thickness 200 nm, to produce a magnetic layer. Next, by means of a DC magnetron sputtering method, there was formed a carbon protective coating of thickness 15 nm and then, by slitting the film, magnetic tape was obtained.

The characteristics of this magnetic tape were extremely outstanding; namely, output=+1.7 dB, durability=○, heat susceptibility=○, dropout=0.3 per min, and the overall evaluation was ⊚.

EXAMPLE 2

Polymer solutions for the A and B layers were prepared in the same way as in Example 1, except that addition was made to the A-layer polymer solution to give a silica concentration of 0.03 wt % in terms of the polymer. These solutions were then cast in the same way as in Example 1 and drying carried out on the belt.

At the same time, a slurry of spherical silica of average particle diameter 16 nm and relative standard deviation 0.15, which had been subjected to 24 hours ultrasonic dispersion in NMP, was added to an NMP solution of aromatic polyamide polymer obtained by reprecipitation, such that the silica concentration was 7.5 wt % and the aromatic polyamide polymer concentration was 2.2 wt %, and filtering carried out with filters of filtration precision 1.0 μm, 0.6 μm and 0.3 μm.

To the gel film, of polymer concentration 40 wt %, separated from the belt, there was applied the aforesaid silica/polymer slurry by means of a metalling bar such-that the layer thickness was 15 nm, and thereafter film production was conducted in the same way as in Example 1 and an aromatic polyamide film of thickness 3.6 μm obtained.

On the A-surface of this film, the number of projections of height at least 20 nm but less than 50 nm was $1.5 \times 10^4$ per $mm^2$, the number of projections of height at least 50 nm but less than 100 nm was $2.0 \times 10^3$ per $mm^2$, and the number of projections of height at least 5 nm but less than 20 nm was $1.3 \times 10^7$ per $mm^2$. Further, the number of coarse projections of $h \geq 270$ nm, h>540 nm, h>810 nm and h>1080 nm was 10, 1, 0 and 0 per 100 $cm^2$ respectively, while SRa2/SRa1 was 1.12, and the tensile Young's modulus in the lengthwise and widthwise directions was 12.0 GPa and 16.7 GPa respectively.

Using this film, magnetic tape was produced in the same way as in Example 1.

The characteristics of this magnetic tape were extremely outstanding; namely, output=+2.5 dB, durability=○, heat susceptibility=◎, dropout=0.1 per min, and the overall evaluation was ◎.

EXAMPLE 3

Polymer solutions for the A and B layers were prepared in the same way as in Example 2. As polymer for providing an outermost layer (hereinafter referred to as the C-layer), there was added to particle-free polymer a slurry of spherical silica of average particle diameter 25 nm, relative standard deviation 0.15 and filterability index ratio Q2/Q1=0.94, formed by ultrasonic dispersion for 24 hours in NMP, so as to prepare a C-layer polymer solution of particle concentration 8.0 wt %, polymer concentration 9.3 wt % and viscosity 2800 poise.

The A-layer, B-layer and C-layer polymer solutions were respectively passed though filters of filtration precision 1000 nm, 5000 nm and 1000 nm, after which they were combined using a layered tube such that the B-layer was in contact with the support, and the C-layer formed the outer layer on the opposite side from the B-layer and, furthermore, so that the final film layer thicknesses were B-layer/A-layer/C-layer=1.6/1.8/0.2 μm, after which film production was carried out in the same way as in Example 1 and film obtained.

On the A-surface of this film, the number of projections of height at least 20 nm but less than 50 nm was $1.8 \times 10^4$ per $mm^2$, the number of projections of height at least 50 nm but less than 100 nm was $1.0 \times 10^3$ per $mm^2$, and the number of projections of height at least 5 nm but less than 20 nm was $9.1 \times 10^6$ per $mm^2$. Further, the number of coarse projections of $h \geq 270$ nm, h>540 nm, h>810 nm and h>1080 nm was 13, 2, 0 and 0 per 100 $cm^2$ respectively, while SRa2/SRa1 was 1.10, and the tensile Young's modulus in the lengthwise and widthwise directions was 12.0 GPa and 16.7 GPa respectively.

Using this film, magnetic tape was produced in the same way as in Example 1.

The characteristics of this magnetic tape were extremely outstanding; namely, output=+2.2 dB, durability=○, heat susceptibility=◎, dropout=0.3 per min, and the overall evaluation was ◎.

EXAMPLE 4

Using the polymer of Example 1, after casting on a belt in the same way, drying was carried out for 1.5 minutes at a temperature of 120° C. and then, together with the belt, the polymer was introduced into a water bath at 40° C. Thereafter, film production was carried out in the same way as in Example 1 and aromatic polyamide film of thickness 3.6 μm obtained.

On the A-surface of this film, the number of projections of height at least 20 nm but less than 50 nm was $5.5 \times 10^5$ per $mm^2$, the number of projections of height at least 50 nm but less than 100 nm was $2.4 \times 10^4$ per $mm^2$, and the number of projections of height at least 5 nm but less than 20 nm was $1.5 \times 10^5$ per $mm^2$. Further, the number of coarse projections of $h \geq 270$ nm, h>540 nm, h>810 nm and h>1080 nm was 45, 16, 3 and 1 per 100 $cm^2$ respectively, while SRa2/SRa1 was 2.82, and the tensile Young's modulus in the lengthwise and widthwise directions was 13.3 GPa and 17.9 GPa respectively.

Using this film, magnetic tape was produced in the same way as in Example 1.

The characteristics of this magnetic tape were output=−0.6 dB, durability=○, heat susceptibility=○, dropout=3.4 per min, and the overall evaluation was Δ.

EXAMPLE 5

Excepting that, as the polymer for the A-layer, there was used polymer with 2 wt % of spherical silica of average particle diameter 100 nm, relative standard deviation 0.25 and filterability index ratio Q2/Q1=0.90, aromatic polyamide film of thickness 3.6 μm was obtained in the same way as in Example 1.

On the A-surface of this film, the number of projections of height at least 20 nm but less than 50 nm was $2.5 \times 10^3$ per $mm^2$, the number of projections of height at least 50 nm but less than 100 nm was $2.7 \times 10^4$ per $mm^2$, and the number of projections of height at least 5 nm but less than 20 nm was $2.0 \times 10^3$ per $mm^2$. Further, the number of coarse projections of $h \geq 270$ nm, h>540 nm, h>810 nm and h>1080 nm was 15, 3, 0 and 0 per 100 $cm^2$ respectively, while SRa2/SRa1 was 1.40, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=+0.4 dB, durability=Δ, heat susceptibility=Δ, dropout=1.3 per min, and the overall evaluation was ○.

EXAMPLE 6

Excepting that, as the polymer for the A-layer, there was used polymer with 0.12 wt % of heat-resistant crosslinked polystyrene particles of average particle diameter 25 nm, relative standard deviation 0.2, filterability index ratio Q2/Q1=0.67 and temperature at which a 10% weight reduction occurred in thermogravimetric analysis of 390° C., aromatic polyamide film of thickness 3.6 μm was obtained in the same way as in Example 1.

On the A-surface of this film, the number of projections of height at least 20 nm but less than 50 nm was $2.4 \times 10^4$ per $mm^2$, the number of projections of height at least 50 nm but less than 100 nm was $3.5 \times 10^3$ per $mm^2$, and the number of projections of height at least 5 nm but less than 20 nm was $1.4 \times 10^6$ per $mm^2$. Further, the number of coarse projections of $h \geq 270$ nm, h>540 nm, h>810 nm and h>1080 nm was 16, 2, 0 and 0 per 100 $cm^2$ respectively, while SRa2/SRa1 was 1.13, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=+ 2.1 dB, durability=○, heat susceptibility=⊚, dropout=0.4 per min, and the overall evaluation was ⊚.

EXAMPLE 7

Polymer was prepared as in Example 1 and, excepting that the A-layer polymer solution was passed through a filter of filtration precision 10000 nm, film production was carried out in the same way as in Example 1 and aromatic polyamide film of thickness 3.6 μm obtained.

On the A-surface of this film, the number of projections of height at least 20 nm but less than 50 nm was $2.3 \times 10^5$ per mm$^2$, the number of projections of height at least 50 nm but less than 100 nm was $1.7 \times 10^4$ per mm$^2$, and the number of projections of height at least 5 nm but less than 20 nm was $6.2 \times 10^4$ per mm$^2$. Further, the number of coarse projections of h≧270 nm, h>540 nm, h>810 nm and h>1080 nm was 130, 55, 10 and 2 per 100 cm$^2$ respectively, while SRa2/SRa1 was 1.52, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=– 0.7 dB, durability=○, heat susceptibility=Δ, dropout=2.7 per min, and the overall evaluation was Δ.

EXAMPLE 8

(Preparation of the A-layer polymer)

Spherical silica of average particle diameter 50 nm and having a particle diameter distribution of relative standard deviation 0.12 was subjected to 24 hours ultrasonic dispersion in NMP, after which there was slowly added polyethylene glycol (PEG) dissolved in NMP such that the amount of PEG in terms of the silica was 10 wt %, and then stirring was carried out for 2 hours at 110° C. This slurry was filtered in turn using filters of filtration precision 1.0 μm, 0.6 μm and 0.3 μm. The filterability index ratio Q2/Q1 of this particle slurry-was 0.98. Silica slurry obtained in this way was added to the aromatic polyamide solution to give 0.3 wt % in terms of the polymer, and then thorough stirring carried out to produce the polymer solution for the A-layer.

As the B-layer polymer solution there was used the same polymer solution as in Example 1, and otherwise film production was carried out in the same way as in Example 1 and aromatic polyamide film of thickness 3.6 μm obtained.

On the A-surface of this film, the number of projections of height at least 20 nm but less than 50 nm was $0.8 \times 10^4$ per mm$^2$, the number of projections of height at least 50 nm but less than 100 nm was $0.1 \times 10^4$ per mm$^2$, and the number of projections of height at least 5 nm but less than 20 nm was $2.0 \times 10^6$ per mm$^2$. Further, the number of coarse projections of h≧270 nm, h>540 nm, h>810 nm and h>1080 nm was 4, 0, 0 and 0 per 100 cm$^2$ respectively, while SRa2/SRa1 was 1.12, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=+ 3.3 dB, durability=○, heat susceptibility=⊚, dropout=0.04 per min, and the overall evaluation was ⊚.

EXAMPLE 9

(Preparation of the A-layer polymer solution)

Spherical silica of average particle diameter 80 nm and having a particle diameter distribution of relative standard deviation 0.08 was subjected to 24 hours ultrasonic dispersion in NMP, after which there was slowly added polyethylene glycol (PEG) dissolved in NMP such that the amount of PEG in terms of the silica was 10 wt %, and then stirring was carried out for 2 hours at 110° C. This slurry was filtered using, in turn, filters of filtration precision 1.0 μm, 0.6 μm and 0.3 μm. Further, the filterability index ratio Q2/Q1 of this slurry was 0.97. (Silica slurry [1])

Moreover, spherical silica of average particle diameter 30 nm and having a particle diameter distribution of relative standard deviation 0.13 was subjected to 24 hours ultrasonic dispersion in NMP, after which there was slowly added polyethylene glycol (PEG) dissolved in NMP such that the amount of PEG in terms of the silica was 10 wt %, and then stirring carried out for 2 hours at 110° C. This slurry was filtered in turn using filters of filtration precision 1.0 μm, 0.6 μm and 0.3 μm. Further, the filterability index ratio Q2/Q1 of this slurry was 0.94. (Silica slurry [2])

Silica slurries [1] and [2] obtained in this way were added to the aromatic polyamide solution to give, respectively, silica concentrations of 0.01 wt % and 1.5 wt % in terms of the polymer, and then thorough stirring carried out to produce the polymer solution for the A-layer.

As the B-layer polymer solution there was used the same polymer solution as in Example 1, and otherwise film production was carried out in the same way as in Example 1 and aromatic polyamide film of thickness 3.6 μm obtained.

On the A-surface of this film, the number of projections of height at least 20 nm but less than 50 nm was $1.6 \times 10^4$ per mm$^2$, the number of projections of height at least 50 nm but less than 100 nm was $0.2 \times 10^4$ per mm$^2$, and the number of projections of height at least 5 nm but less than 20 nm was $1.2 \times 10^7$ per mm$^2$. Further, the number of coarse projections of h≧270 nm, h>540 nm, h>810 nm and h>1080 nm was 6, 0, 0 and 0 per 100 cm cm$^2$ respectively, while SRa2/SRa1 was 1.13, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=+ 3.1 dB, durability=○, heat susceptibility=⊚, dropout=0.1 per min, and the overall evaluation was ⊚.

COMPARATIVE EXAMPLE 1

Excepting that, as the polymer for the A-layer, there was used polymer with 5 wt % of spherical silica of average particle diameter 50 nm and relative standard deviation 0.12, aromatic polyamide film of thickness 3.6 μm was obtained in the same way as in Example 1.

On the A-surface of this film, the number of projections of height at least 20 nm but less than 50 nm was $1.2 \times 10^6$ per mm$^2$, the number of projections of height at least 50 nm but less than 100 nm was $6.0 \times 10^4$ per mm$^2$, and the number of projections of height at least 5 nm but less than 20 nm was $6.0 \times 10^6$ per mm$^2$. Further, the number of coarse projections of h≧270 nm, h>540 nm, h>810 nm and h>1080 nm was 35, 10, 2 and 0 per 100 cm$^2$ respectively, while SRa2/SRa1 was 1.51, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=−2.4 dB, durability=X, heat susceptibility=Δ, dropout=5.1 per min, and the overall evaluation was X.

COMPARATIVE EXAMPLE 2

Excepting that, as the polymer for the A-layer, there was used polymer with 0.003 wt % of spherical silica of average particle diameter 16 nm and relative standard deviation 0.15, aromatic polyamide film of thickness 3.6 μm was obtained in the same way as in Example 1.

On the A-surface of this film, the number of projections of height at least 20 nm but less than 50 nm was $7.0 \times 10^2$ per mm$^2$, the number of projections of height at least 50 nm but less than 100 nm was $8.0 \times 10^2$ per mm$^2$, and the number of projections of height at least 5 nm but less than 20 nm was $1.5 \times 10^3$ per mm$^2$. Further, the number of coarse projections of h≧270 nm, h>540 nm, h>810 nm and h>1080 nm was 7, 2, 0 and 0 per 100 cm$^2$ respectively, while SRa2/SRa1 was 1.07, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=+2.9 dB, durability=X, heat susceptibility=X, dropout=0.3 per min, and the overall evaluation was X.

COMPARATIVE EXAMPLE 3

Excepting that, as the polymer for the A-layer, there was used polymer with 1.0 wt % of spherical silica of average particle diameter 120 nm, relative standard deviation 1.10 and filterability index ratio Q2/Q1=0.26, aromatic polyamide film of thickness 3.6 μm was obtained in the same way as in Example 1.

On the A-surface of this film, the number of projections of height at least 20 nm but less than 50 nm was $4.7 \times 10^3$ per mm$^2$, the number of projections of height at least 50 nm but less than 100 nm was $4.2 \times 10^4$ per mm$^2$, and the number of projections of height at least 5 nm but less than 20 nm was $7.5 \times 10^4$ per mm$^2$. Further, the number of coarse projections of h≧270 nm, h>540 nm, h>810 nm and h>1080 nm was 28, 2, 0 and 0 per 100 cm$^2$ respectively, while SRa2/SRa1 was 1.18, and the tensile Young's modulus in the lengthwise and widthwise directions was 12.0 GPa and 16.7 GPa respectively.

Using this film, magnetic tape was produced in the same way as in Example 1.

The characteristics of this magnetic tape were output=−1.3 dB, durability=X, heat susceptibility=Δ, dropout=3.7 per min, and the overall evaluation was X.

TABLE 1

|  | A-Layer | | | | B-Layer | | | |
|---|---|---|---|---|---|---|---|---|
|  | Particles | Diam. (nm) | Amount Added (wt %) | Thickness (μm) | Particles | Diam. (nm) | Amount Added (wt %) | Thickness (μm) | Other |
| Example 1 | spherical silica | 50 | 0.3 | 2.0 | spherical silica | 150 | 1.2 | 1.6 | |
| Example 2 | spherical silica | 50 | 0.03 | 2.0 | spherical silica | 150 | 1.2 | 1.6 | 15 nm layer of spherical silica of diameter 16 nm |
| Example 3 | spherical silica | 50 | 0.03 | 1.8 | spherical silica | 150 | 1.2 | 1.6 | 0.2 μm layer of spherical silica of diameter 25 nm |
| Example 4 | spherical silica | 50 | 0.3 | 2.0 | spherical silica | 150 | 1.2 | 1.6 | |
| Example 5 | spherical silica | 100 | 2.0 | 2.0 | spherical silica | 150 | 1.2 | 1.6 | |
| Example 6 | crosslinked polystyrene | 25 | 0.12 | 2.0 | spherical silica | 150 | 1.2 | 1.6 | |
| Example 7 | spherical silica | 50 | 0.3 | 2.0 | spherical silica | 150 | 1.2 | 1.6 | |
| Example 8 | spherical silica treated with PEG | 50 | 0.3 | 2.0 | spherical silica | 150 | 1.2 | 1.6 | |
| Example 9 | spherical silica treated with PEG | 80 30 | 0.01 1.5 | 2.0 | spherical silica | 150 | 1.2 | 1.6 | |
| Comp. Ex. 1 | spherical silica | 50 | 5.0 | 2.0 | spherical silica | 150 | 1.2 | 1.6 | |
| Comp. Ex. 2 | spherical silica | 16 | 0.003 | 2.0 | spherical silica | 150 | 1.2 | 1.6 | |
| Comp. Ex. 3 | spherical silica | 120 | 1.0 | 2.0 | spherical silica | 150 | 1.2 | 1.6 | |

TABLE 2

|  | A-Surface Projections (Number/mm$^2$) Projection Height (nm) | | | A-Surface Coarse Projections (Number/100 cm$^2$) | | | | A-Surface |
|---|---|---|---|---|---|---|---|---|
|  | 20~50 | 50~100 | 5~20 | ≧270 | >540 | >810 | >1080 | SRa2/SRa1 |
| Example 1 | $2.1 \times 10^5$ | $1.2 \times 10^4$ | $8.6 \times 10^4$ | 8 | 1 | 0 | 0 | 1.16 |
| Example 2 | $1.5 \times 10^4$ | $2.0 \times 10^3$ | $1.3 \times 10^7$ | 10 | 1 | 0 | 0 | 1.12 |
| Example 3 | $1.8 \times 10^4$ | $1.0 \times 10^3$ | $9.1 \times 10^6$ | 13 | 2 | 0 | 0 | 1.10 |
| Example 4 | $5.5 \times 10^5$ | $2.4 \times 10^4$ | $1.5 \times 10^5$ | 45 | 16 | 3 | 1 | 2.82 |
| Example 5 | $2.5 \times 10^3$ | $2.7 \times 10^4$ | $2.0 \times 10^3$ | 15 | 3 | 0 | 0 | 1.40 |
| Example 6 | $2.4 \times 10^4$ | $3.5 \times 10^3$ | $1.4 \times 10^6$ | 16 | 2 | 0 | 0 | 1.13 |
| Example 7 | $2.3 \times 10^5$ | $1.7 \times 10^4$ | $6.2 \times 10^4$ | 130 | 55 | 10 | 2 | 1.52 |
| Example 8 | $0.8 \times 10^4$ | $0.1 \times 10^4$ | $2.0 \times 10^6$ | 4 | 0 | 0 | 0 | 1.12 |
| Example 9 | $1.6 \times 10^4$ | $0.2 \times 10^4$ | $1.2 \times 10^7$ | 6 | 0 | 0 | 0 | 1.13 |
| Comp. Ex. 1 | $1.2 \times 10^6$ | $6.0 \times 10^4$ | $6.0 \times 10^6$ | 35 | 10 | 2 | 0 | 1.51 |

TABLE 2-continued

| | A-Surface Projections (Number/mm$^2$) Projection Height (nm) | | | A-Surface Coarse Projections (Number/100 cm$^2$) | | | | A-Surface SRa2/SRa1 |
|---|---|---|---|---|---|---|---|---|
| | 20~50 | 50~100 | 5~20 | ≧270 | >540 | >810 | >1080 | |
| Comp. Ex. 2 | 7.0 × 10$^2$ | 8.0 × 10$^2$ | 1.5 × 10$^3$ | 7 | 2 | 0 | 0 | 1.07 |
| Comp. Ex. 3 | 4.7 × 10$^3$ | 4.2 × 10$^4$ | 7.5 × 10$^4$ | 28 | 2 | 0 | 0 | 1.18 |

TABLE 3

| | Output Characteristic (dB) | Durability | Heat Susceptibity | Drop-Out (No./min) | Overall Evaluation |
|---|---|---|---|---|---|
| Example 1 | +1.1 | ◯ | ◯ | 0.3 | ⊚ |
| Example 2 | +2.5 | ◯ | ⊚ | 0.1 | ⊚ |
| Example 3 | +2.2 | ◯ | ⊚ | 0.3 | ⊚ |
| Example 4 | −0.6 | ◯ | ◯ | 3.4 | Δ |
| Example 5 | +0.4 | Δ | Δ | 1.3 | ◯ |
| Example 6 | +2.1 | ◯ | ⊚ | 0.4 | ⊚ |
| Example 7 | −0.7 | ◯ | Δ | 2.7 | Δ |
| Example 8 | +3.3 | ◯ | ⊚ | 0.04 | ⊚ |
| Example 9 | +3.1 | ◯ | ⊚ | 0.1 | ⊚ |
| Comp. Ex. 1 | −2.4 | X | Δ | 5.1 | X |
| Comp. Ex. 2 | +2.9 | X | X | 0.3 | X |
| Comp. Ex. 3 | −1.3 | X | Δ | 3.7 | X |

We claim:

1. Aromatic polyamide film having a plurality of projections characterized in that on at least one surface of said film the number of said projections having a height of at least 20 nm but less than 50 nm is from $10^3$ to $10^8$ per mm$^2$, and the number of projections having a height of at least 50 nm but less than 100 nm is from 0 to $3 \times 10^4$ per mm$^2$ and wherein the number of projections having a height of at least 5 nm but less than 20 nm on said surface is at least $5 \times 10^3$ per mm$^2$.

2. Aromatic polyamide film according to claim 1 characterized in that the number of coarse projections of height h in nm, on said surface satisfies the following relationships:

h≧270 A<100 h>540 A<70 h>810 A<15 h>1080 A<5 where A is the number of course projections per 100 cm$^2$.

3. Aromatic polyamide film according to claim 1, which is characterized in that the three-dimensional surface roughness SRa1 at a measurement area of 0.002 mm$^2$ and the three-dimensional surface roughness SRa2 at a measurement area of 1.0 mm$^2$ on said surface satisfy the following relationship.

0.8≦SRa2/SRa1≦2.5.

4. Aromatic polyamide film according to claim 1, which is characterized in that said film comprising at least two layers, containing an A-layer and a B-layer.

5. Aromatic polyamide film according to claim 1, which is characterized in that the tensile Young's modulus in at least one direction is at least 9.8 GPa.

6. Magnetic recording media formed by providing a magnetic layer on at least one surface of the aromatic polyamide film of claim 1.

7. The magnetic recording media according to claim 6, comprising a magnetic tape having a thickness of 6.5 μm or less, a width of 2.3 to 9.0 mm, a length of at least 100 m/reel and a recording density as a magnetic recording medium of at least 8 kilobyte/mm$^2$.

8. A method of producing aromatic polyamide film which is characterized in that, in a method of producing aromatic polyamide film from a solution obtained by adding to an aromatic polyamide solution a particle-containing slurry formed by dispersing particles of particle diameter 10 to 300 nm in a liquid medium of 10 poise or less, such that the amount of said particles added in terms of the aromatic polyamide is 0.005 to 4.5 wt %, the relative standard deviation in the diameters of said particles is no more than 0.8 and, furthermore, there is used a particle-containing slurry where the initial filterability index Q1 of said particle-containing slurry and the filterability index Q2 after the passage of 500 ml of liquid satisfy the following relation

Q2/Q1≧0.3.

9. A method of producing aromatic polyamide film according to claim 8 which is characterized in that the particles described in claim 7 comprise an inorganic material, and said particles have been given a surface treatment by means of organic polymer.

* * * * *

UNITED STATES PATENT AND TRADEMARK OFFICE
CERTIFICATE OF CORRECTION

PATENT NO. : 5,993,938
DATED : November 30, 1999
INVENTOR(S) : Akimitsu Tsukuda et al It is certified that error appears in the above-identified patent and that said Letters Patent is hereby corrected as shown below:

In Column 5 at line 4 please change "0.84" to - -0.8- -

In Column 22 at approximately line 56 please change "claim 7" to - - claim 8- -.

Signed and Sealed this

Thirty-first Day of October, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO.: 5,993,938
DATED: November 30, 1999
INVENTOR(S): Akimitsu Tsukuda et al It is certified that error appears in the above-identified patent and that said Letters Patent is hereby corrected as shown below:

In Column 4, at line 42, please change "$\sigma \geq 0.80$" to --$\sigma \leq 0.80$--; and after preferably, first occurrence, change "$\sigma \geq 0.30$" to --$\sigma \leq 0.30$--; and at line 43, please change "$\geq 0.15$" to --$\leq 0.15$--.

Signed and Sealed this

Fourteenth Day of November, 2000

*Attest:*

Q. TODD DICKINSON

*Attesting Officer*     *Director of Patents and Trademarks*